(12) United States Patent
Komoda

(10) Patent No.: US 8,356,118 B2
(45) Date of Patent: Jan. 15, 2013

(54) STORAGE DEVICE AND STORAGE DEVICE ACCESS CONTROL METHOD

(75) Inventor: Hideaki Komoda, Aichi (JP)

(73) Assignee: Buffalo Inc., Nagoya-shi (JP)

(*) Notice: Subject to any disclaimer, the term of this patent is extended or adjusted under 35 U.S.C. 154(b) by 384 days.

(21) Appl. No.: 12/208,485

(22) Filed: Sep. 11, 2008

(65) Prior Publication Data

US 2009/0089460 A1  Apr. 2, 2009

(30) Foreign Application Priority Data

Oct. 1, 2007  (JP) ................................. 2007-257394

(51) Int. Cl.
  *G06F 3/00* (2006.01)
(52) U.S. Cl. ............... 710/13; 710/14; 710/74; 711/173
(58) Field of Classification Search .................... None
  See application file for complete search history.

(56) References Cited

U.S. PATENT DOCUMENTS

| | | | | |
|---|---|---|---|---|
| 5,838,910 A * | 11/1998 | Domenikos et al. | .......... | 709/203 |
| 6,851,614 B2 * | 2/2005 | Garnett | .......... | 235/487 |
| 2004/0213273 A1 * | 10/2004 | Ma | .......... | 370/401 |
| 2004/0219500 A1 * | 11/2004 | Brown et al. | .......... | 434/307 R |
| 2005/0182973 A1 * | 8/2005 | Funahashi et al. | .......... | 713/202 |
| 2006/0007576 A1 * | 1/2006 | Georgis | .......... | 360/69 |
| 2006/0010458 A1 * | 1/2006 | Georgis | .......... | 720/600 |
| 2006/0095647 A1 * | 5/2006 | Battaglia et al. | .......... | 711/100 |
| 2006/0103966 A1 * | 5/2006 | Georgis | .......... | 360/69 |
| 2006/0174352 A1 * | 8/2006 | Thibadeau | .......... | 726/27 |
| 2006/0176595 A1 | 8/2006 | Nagata | | |
| 2006/0184806 A1 | 8/2006 | Luttmann et al. | | |
| 2006/0190941 A1 | 8/2006 | Kobayashi et al. | | |
| 2007/0011469 A1 * | 1/2007 | Allison et al. | .......... | 713/193 |
| 2007/0150887 A1 * | 6/2007 | Shapiro | .......... | 717/174 |
| 2007/0204153 A1 * | 8/2007 | Tome et al. | .......... | 713/164 |
| 2007/0233973 A1 * | 10/2007 | Uno | .......... | 711/154 |
| 2008/0006704 A1 * | 1/2008 | Kim | .......... | 235/492 |
| 2008/0046967 A1 * | 2/2008 | Pan et al. | .......... | 726/2 |
| 2008/0082447 A1 * | 4/2008 | Jogand-Coulomb et al. | ... | 705/53 |
| 2008/0114906 A1 * | 5/2008 | Hummel et al. | .......... | 710/22 |
| 2008/0148057 A1 * | 6/2008 | Hauw | .......... | 713/185 |

(Continued)

FOREIGN PATENT DOCUMENTS

JP  2000112579  4/2000

(Continued)

OTHER PUBLICATIONS

Taiwanese Office Action issued Aug. 30, 2011 in Taiwan Patent Application No. 097136503 (with English translation) 9 pages.

(Continued)

*Primary Examiner* — Henry Tsai
*Assistant Examiner* — Christopher Bartels
(74) *Attorney, Agent, or Firm* — Oblon, Spivak, McClelland, Maier & Neustadt, L.L.P.

(57) ABSTRACT

A storage device is removably connectable to a host computer. The storage device includes: a storage unit on which one or more storage areas are allocatable to a plurality of users; and a control unit. The control unit is operable to, when the storage deice receives authentication success information indicating that authentication for one of the users is succeeded from the host computer or other external device, simulatively mount the storage area allocated to the authenticated user and unmount the storage area allocated to another user.

12 Claims, 16 Drawing Sheets

U.S. PATENT DOCUMENTS

| | | | |
|---|---|---|---|
| 2008/0244106 A1* | 10/2008 | Kadota | 710/13 |
| 2008/0263349 A1* | 10/2008 | Ota et al. | 713/2 |
| 2008/0270574 A1* | 10/2008 | Hanes | 709/219 |
| 2009/0064284 A1* | 3/2009 | Poston et al. | 726/4 |
| 2009/0100215 A1* | 4/2009 | Nochimowski | 711/103 |
| 2009/0271533 A1* | 10/2009 | Asnaashari | 710/13 |

FOREIGN PATENT DOCUMENTS

| | | |
|---|---|---|
| JP | 2004-46878 | 2/2004 |
| JP | 2004-151785 | 5/2004 |
| JP | 2006-221288 | 8/2006 |
| JP | 2007-4251 | 1/2007 |
| JP | 2007-141083 | 6/2007 |
| WO | WO 2006/088681 A2 | 8/2006 |

OTHER PUBLICATIONS

Japanese Office Action issued Feb. 7, 2012, in Patent Application No. 2007-257394 (with English-language translation).

* cited by examiner

FIG. 8

|  | USER ID | PHYSICAL AREA INFORMATION ||| LOGICAL AREA (PARTITION) INFORMATION |||
|---|---|---|---|---|---|---|---|
|  |  | TOTAL CAPACITY | START ADDRESS | END ADDRESS | TOTAL CAPACITY | START ADDRESS | END ADDRESS |
| (CONTROL CARD) | 0 | 512 MB | 00000000 | 22222222 | 512 MB | 00000000 | 22222222 |
| (USER A AREA) | 1 | 256 MB | 22222223 | 33333333 | 256 MB | 00000000 | 11111111 |
| (USER B AREA) | 2 | 256 MB | 33333334 | 44444444 | 256 MB | 00000000 | 11111111 |
| (USER C AREA) | 3 | 256 MB | 44444445 | 55555555 | 256 MB | 00000000 | 11111111 |

138

<USER AUTHENTICATION TABLE>

| USER NAME | PASSWORD | USER ID |
|---|---|---|
| A | 235v65 | 1 |
| B | abc546 | 2 |
| C | py8e66 | 3 |

STORAGE DEVICE AND STORAGE DEVICE ACCESS CONTROL METHOD

CROSS-REFERENCE TO RELATED APPLICATIONS

This application is based upon and claims priority from Japanese Patent Application No. 2007-257394 filed on Oct. 1, 2007, the entire contents of which are incorporated herein by reference.

TECHNICAL FIELD

The invention relates to a technology for controlling access to an external storage device connected to a host computer for each user.

BACKGROUND

The progress of an interface supporting hot plugging such as USB allows a wide use of an external storage device such as flash memory or a removable hard disk drive connectable to a computer (host computer). The external storage device is described in JP-A-2007-4251 and JP-A-2007-141083, for example.

When one host computer is shared by two or more users, the storage area of an external storage device connected to the host computer is shared by the users. In such a case, there arises a need to prohibit another user to access the file or directory for each user stored in the storage device. In response thereto, an access control method has been proposed, which includes allocating a storage area to each user and setting the access right to a directory and a file in the allocated storage area.

However, according to the access control method, all user's storage areas can be accessed from an operating system (OS) operating in the host computer. Therefore, a malicious user may access the storage area of another user through the OS, and may tamper with, tap of a file, a directory, etc.

SUMMARY

It is an object of the invention to provide a technique to prevent any other user from accessing the storage area allocated to each user even when two or more users share an removable external storage device connectable to a host computer.

According to an aspect of the invention, there is provided a removable storage device connectable to a host computer, said storage device comprising: a storage unit on which one or more storage areas are allocated to a plurality of users; and a control unit operable to, when the storage device receives authentication success information indicating that authentication for one of the users is succeeded from the host computer or other external device, simulatively mount the storage area allocated to the authenticated user and unmount the storage area allocated to another user.

According to another aspect of the invention, there is provided a storage device access control method for controlling access to a removable storage device connectable to a host computer, said storage device access control method comprising: (a) allocating storage areas to a plurality of users in the storage device; and (b) when the storage device receives authentication success information indicating that authentication for one of the users is succeeded from the host computer or other external device in the storage device, simulatively mount the storage area allocated to the authenticated user and unmount the storage area allocated to another user.

According to still another aspect of the invention, there is provided a computer-readable medium having a computer program stored thereon and readable by a computer, said computer program, when executed by the computer, causes the computer to perform operations for a removable storage device connectable to a host computer which comprises a storage unit on which one or more storage areas are allocated to a plurality of users, said operations comprising: when the storage device receives authentication success information indicating that authentication for one of the users is succeeded from the host computer or other external device in the storage device, simulatively mount the storage area allocated to the authenticated user and unmount the storage area allocated to another user.

BRIEF DESCRIPTION OF THE DRAWINGS

FIG. 8 is a schematic diagram to show an example of the descriptions of an area specification table;

DESCRIPTION

The best mode for carrying out the invention will be discussed based on embodiments in the following order:
A. First embodiment;
B. Second embodiment; and
C. Modified example.

A. First Embodiment

Figure 1:
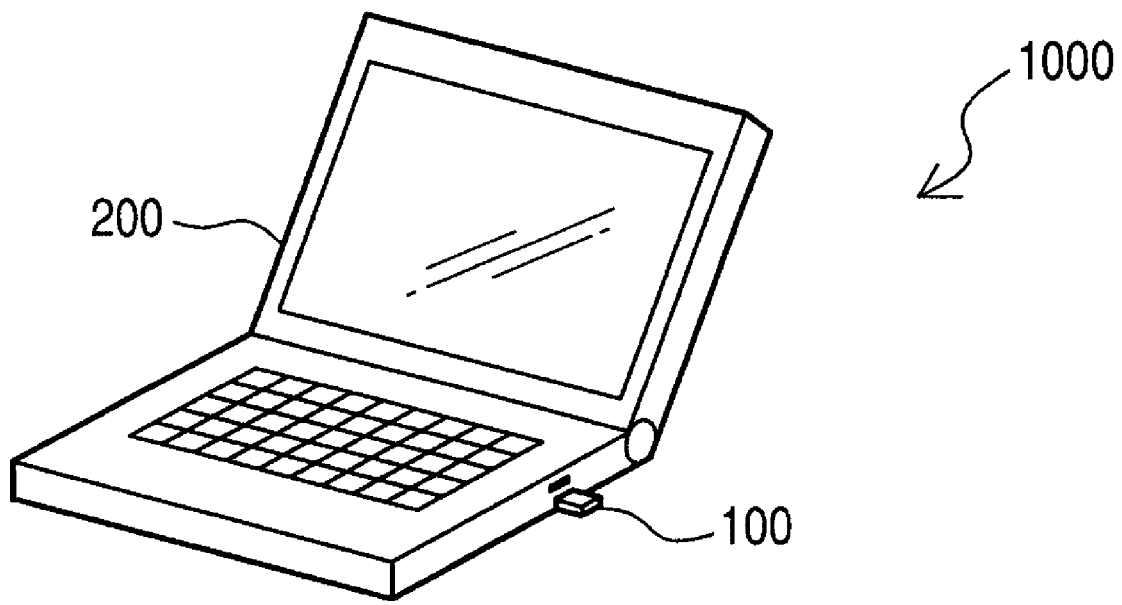
FIG. 1 is a schematic diagram to show the device configuration of an information processing system incorporating a storage device as an embodiment of the invention.

A1. System Configuration:

FIG. 1 is a schematic diagram to show the apparatus configuration of an information processing system including a storage device according to an embodiment of the invention. An information processing system 1000 includes a host computer 200 and USB flash memory 100 as an external storage device. The host computer 200 includes USB (Universal Serial Bus) ports and the USB flash memory 100 as an external storage device can be externally connected to the USB port. In the example in FIG. 1, the host computer 200 includes two USB ports provided at the upper and lower stages on one side of the host computer 200, and the USB flash memory 100 is connected to the port at the lower stage. As shown in FIG. 1, the host computer 200 and the USB flash memory 100 are connected by a cable, but may be wirelessly connected using a wireless device such as wireless USB.

Figure 2:
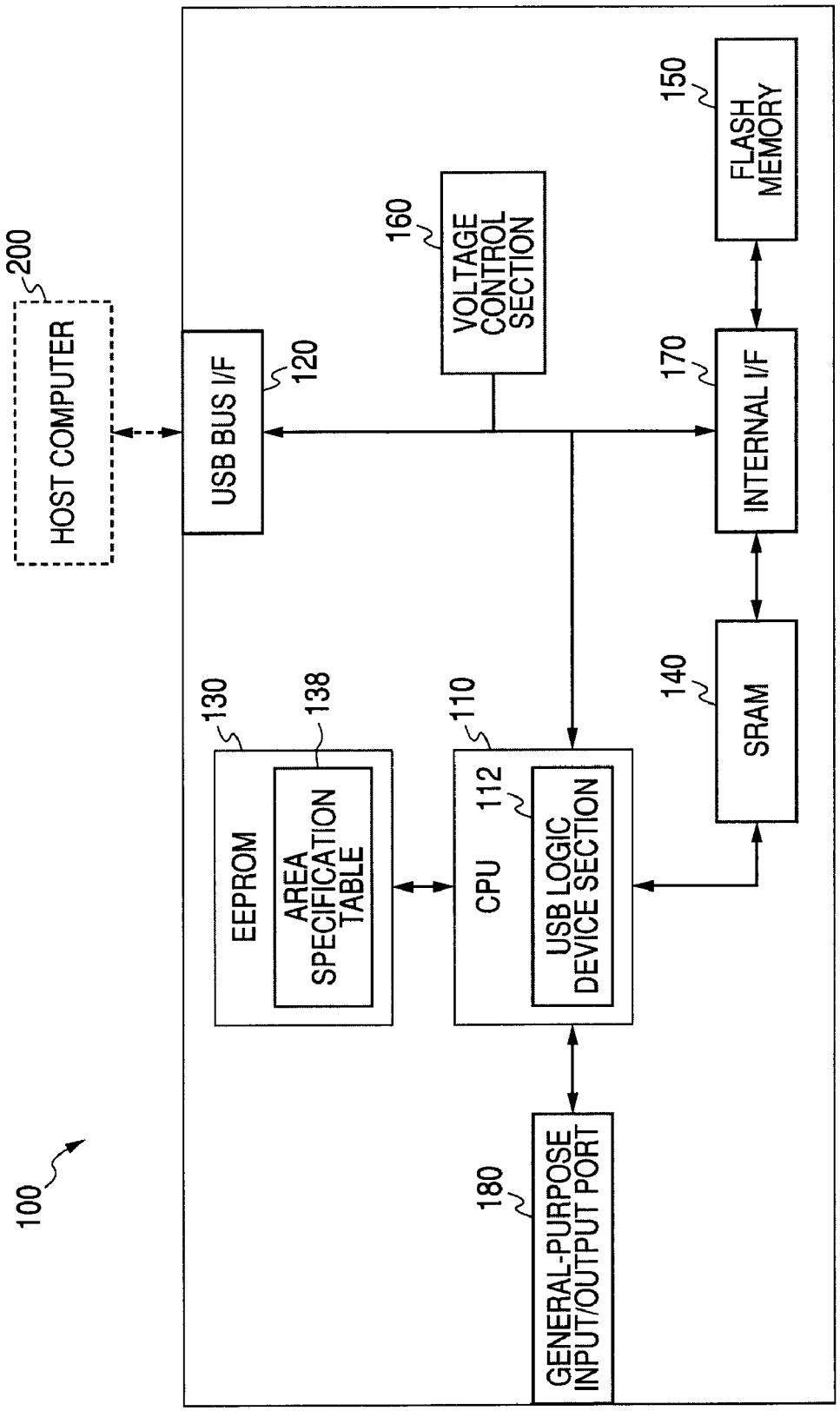
FIG. 2 is a block diagram to show the internal configuration of USB flash memory shown in FIG. 1.

FIG. 2 is a block diagram to show the internal configuration of the USB flash memory 100 shown in FIG. 1. The USB flash memory 100 includes a CPU 110, a USB bus interface 120, EEPROM 130, SRAM 140, flash memory 150, a voltage control section 160, an internal interface 170, and a general-purpose input/output port 180, which are connected by an internal bus.

The USB bus interface 120 executes physical communications in accordance with USB. The EEPROM 130 previously stores an area specification table 138. The area specification table 138 is described later in detail. The flash memory 150 provides a storage area as a storage device. The storage capacity of the flash memory 150 can be 2 GB, for example. The internal interface 170 provides an interface for transferring data to and from the flash memory 150. The general-purpose input/output port 180 is a parallel interface used to connect an additional device such as a fingerprint authentication device, for example. The voltage control section 160 regulates bus powered power supply from the host computer 200 connected through the USB bus interface 120 to predetermined voltage (3.3 V, for example), and supplies the power to the sections.

A USB control program 137 (see FIGS. 17A and 17B) is stored on the EEPROM 130. When the CPU 110 expands the program on the SRAM 140 and executes the program, the CPU 110 functions as a USB logic device section 112.

Figure 3:
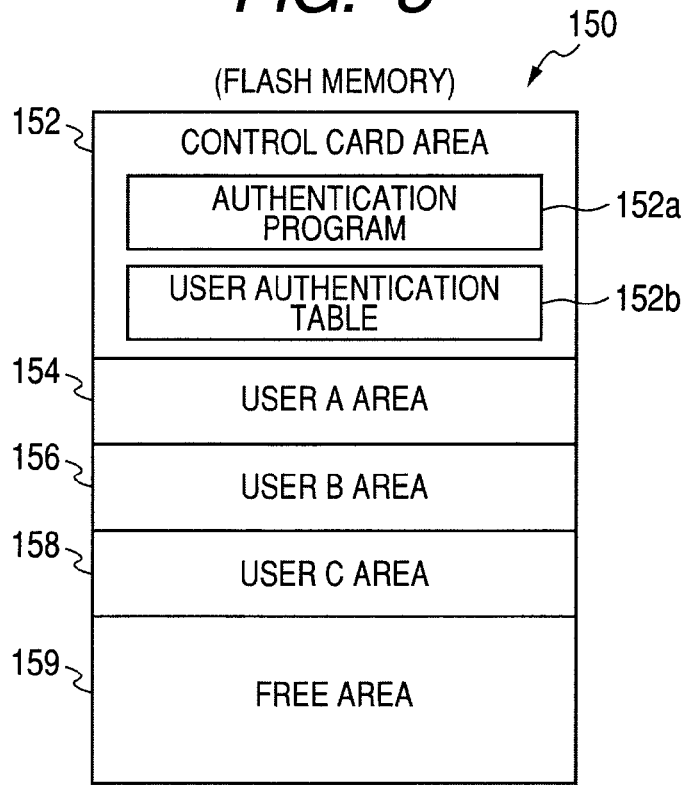
FIG. 3 is a schematic diagram to schematically show the storage area of flash memory shown in FIG. 2.

FIG. 3 is a schematic diagram to show the storage area of the flash memory 150 shown in FIG. 2. The flash memory 150 includes a control card area 152, storage areas allocated to the users of the information processing system 1000, and a free area 159. In the example in FIG. 3, three users A, B, and C are registered as the users of the information processing system 1000; a user A area 154 is allocated to the user A, a user B area 156 is allocated to the user B, and a user C area 158 is allocated to the user C. An authentication program 152a and a user authentication table 152b are previously stored on the control card area 152. The authentication program 152a is a program for authenticating the user to log in to the information processing system 1000. A control card is described later.

Figure 4:
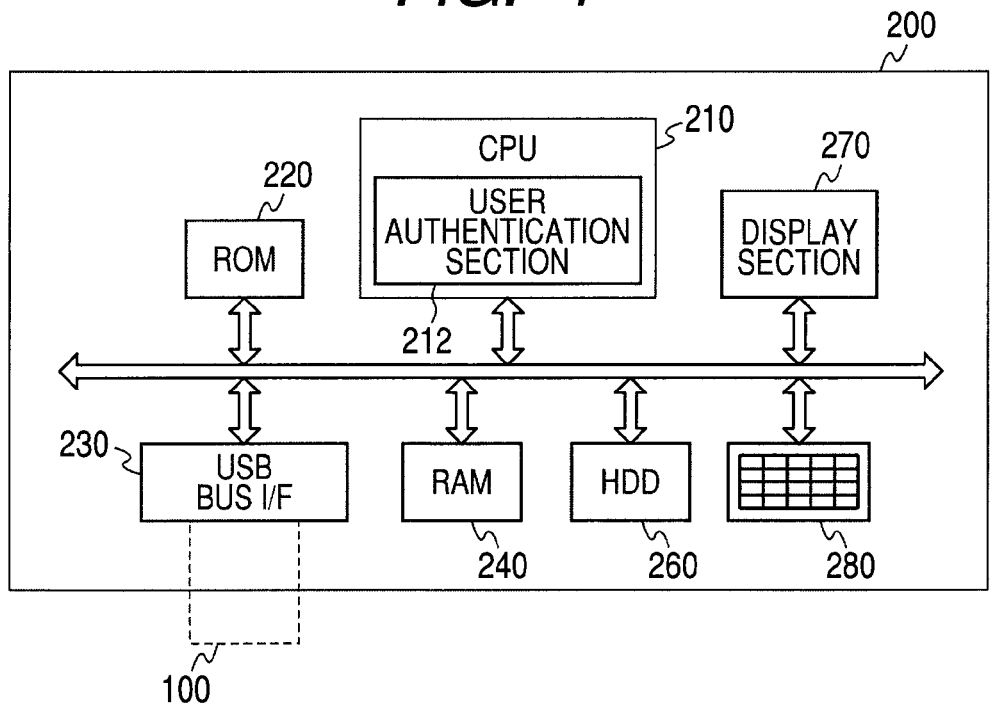
FIG. 4 is a block diagram to show the internal configuration of a host computer shown in FIG. 1.

FIG. 4 is a block diagram to show the internal configuration of the host computer 200 shown in FIG. 1. The host computer 200 includes a CPU 210, ROM 220, a USB bus interface 230, RAM 240, a hard disk drive 260, a display section 270, and a keyboard 280, which are connected by an internal bus. The USB bus interface 230 includes a USB port and allows the USB flash memory 100 to be connected to the host computer 200. The USB bus interface 230 also executes physical communication according to USB, similar to the USB bus interface 120 in FIG. 2.

The CPU 210 reads the authentication program 152a (FIG. 3) from the USB flash memory 100 and executes the program under a predetermined operating system, thereby functioning as a user authentication section 212. The ROM 220 stores various programs for USB communication (USB system software and driver software). For example, Microsoft Windows (registered trademark) can be adopted as the operating system.

Figure 5:
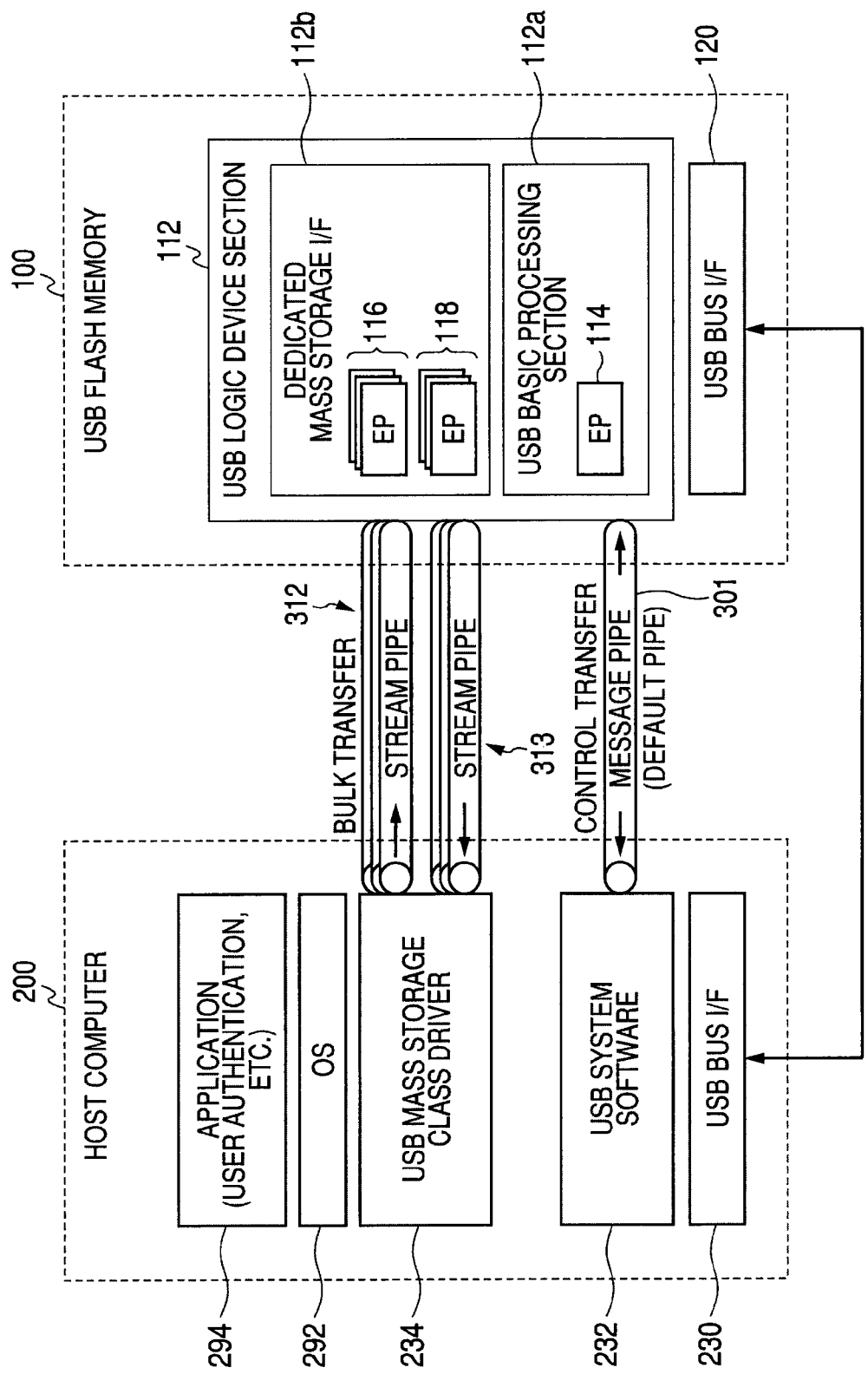
FIG. 5 is a schematic diagram to show the hierarchical structure of the functions concerning data transfer between the host computer and the USB flash memory.

FIG. 5 is a schematic diagram to show the hierarchical structure of the functions concerning data transfer between the host computer 200 and the USB flash memory 100. In the host computer 200, the USB bus interface 230 for controlling signal transfer in a physical layer is located as the lowest layer, and USB system software 232, a USB mass storage class driver 234, an operating system 292, and application 294 such as user authentication application are located above the USB bus interface 230 in this order. On the other hand, in the USB flash memory 100, the USB bus interface 120 is located as the lowest layer, and the USB logic device section 112 is located above the USB bus interface 120. The USB logic device section 112 includes a USB basic processing section 112a and a dedicated mass storage interface 112b.

The USB basic processing section 112a includes an end point 114 and perform control transfer with the USB system software 232 via a message pipe 301. The USB basic processing section 112a can form the message pipe 301 with the USB system software 232 provided in the host computer 200. The term "end point" refers to a resource (e.g., buffer) in the device (the USB flash memory 100) used for communicating with the host. The term "message pipe" refers to logical connection to allow two-way communication. The message pipe 301 is also called default pipe and allows logical connection dedicated to communication for various settings/control (control transfer) between the host (host computer 200) and the device (the USB flash memory 100).

A stream pipe group 312 for use with transfer in an IN direction (input direction to the host computer 200) and a stream pipe group 313 for use with transfer in an OUT direction (output direction from the host computer 200) are provided between the dedicated mass storage interface 112b and the USB mass storage class driver 234. The term "stream pipe" refers to one-way logical connection used with communication other than control transfer, e.g., bulk transfer, interrupt transfer, etc. The term "bulk transfer" refers to communication of transferring comparatively large-capacity data collectively at high speed, and the term "interrupt transfer" refers to communication of transferring small-capacity data at regular time intervals. The dedicated mass storage interface 112b includes: an end point group 116 including end points provided in a one-to-one correspondence with the pipes of the stream pipe group 312; and an end point group 118 including end points provided in a one-to-one correspondence with the pipes of the stream pipe group 313. The reason why the interface is called "dedicated mass storage interface 112b" is that the interface has a function different from the function of a standard mass storage interface.

The information processing system 1000 can be used by two or more users. In this embodiment, three users (user A, user B, and user C) uses the information processing system 1000. The information processing system 1000 performs access control so as to prohibit the user A, B, or C from accessing the storage area of another user. An outline of the access control will be described with reference to FIG. 6.

Figure 6:
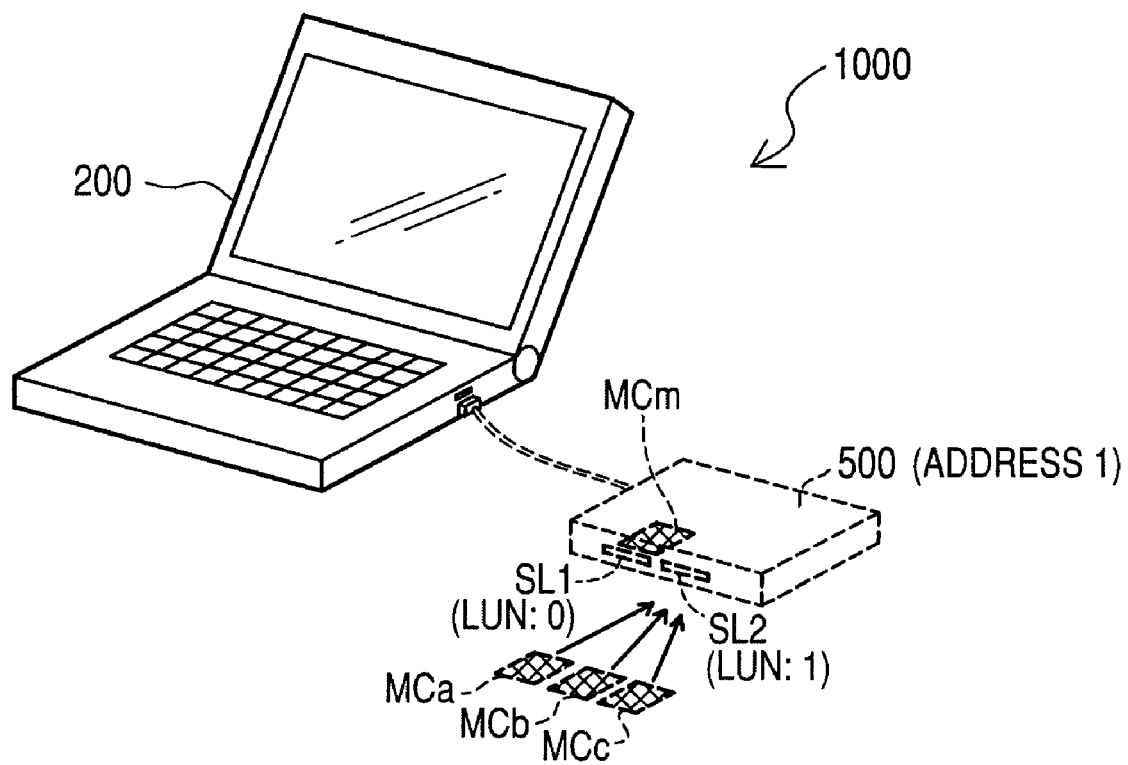
FIG. 6 is a schematic diagram to show the simulated device configuration for access control in the information processing system.

FIG. 6 is a schematic diagram to show the simulated device configuration for the access control in the information processing system 1000. In the actual device configuration of the information processing system 1000, the external USB flash memory 100 is connected to the host computer 200 as shown in FIG. 1. However, in the information processing system 1000, the USB flash memory 100 simulatively (pretends to) behave as a logical multicard reader 500 connected to the host computer 200.

According to the simulated configuration, the logical multicard reader 500 includes two card slots SL1 and SL2, a memory card (control card) MCm for performing access control is always inserted into the first slot SL1, and a memory card is not inserted into the second slot SL2 in the initial state. When a user accesses the USB flash memory 100, a configuration is simulated wherein a logical memory card for the user (user A card MCa, user B card MCb, user C card MCc) is inserted into the multicard reader 500. The user A card MCa corresponds to the user A area 154 in the flash memory 150. Likewise, the user B card MCb corresponds to the user B area 156 and the user C card MCc corresponds to the user C area 158. The simulated configuration as described above is adopted, whereby each user A, B, or C can access only his or her own memory card inserted into the multicard reader 500 and cannot access the memory card of another user not inserted into the multicard reader 500. That is, each user A, B, or C can access only his or her own storage area and cannot access the storage area of another user, and access control is realized.

Figure 7:
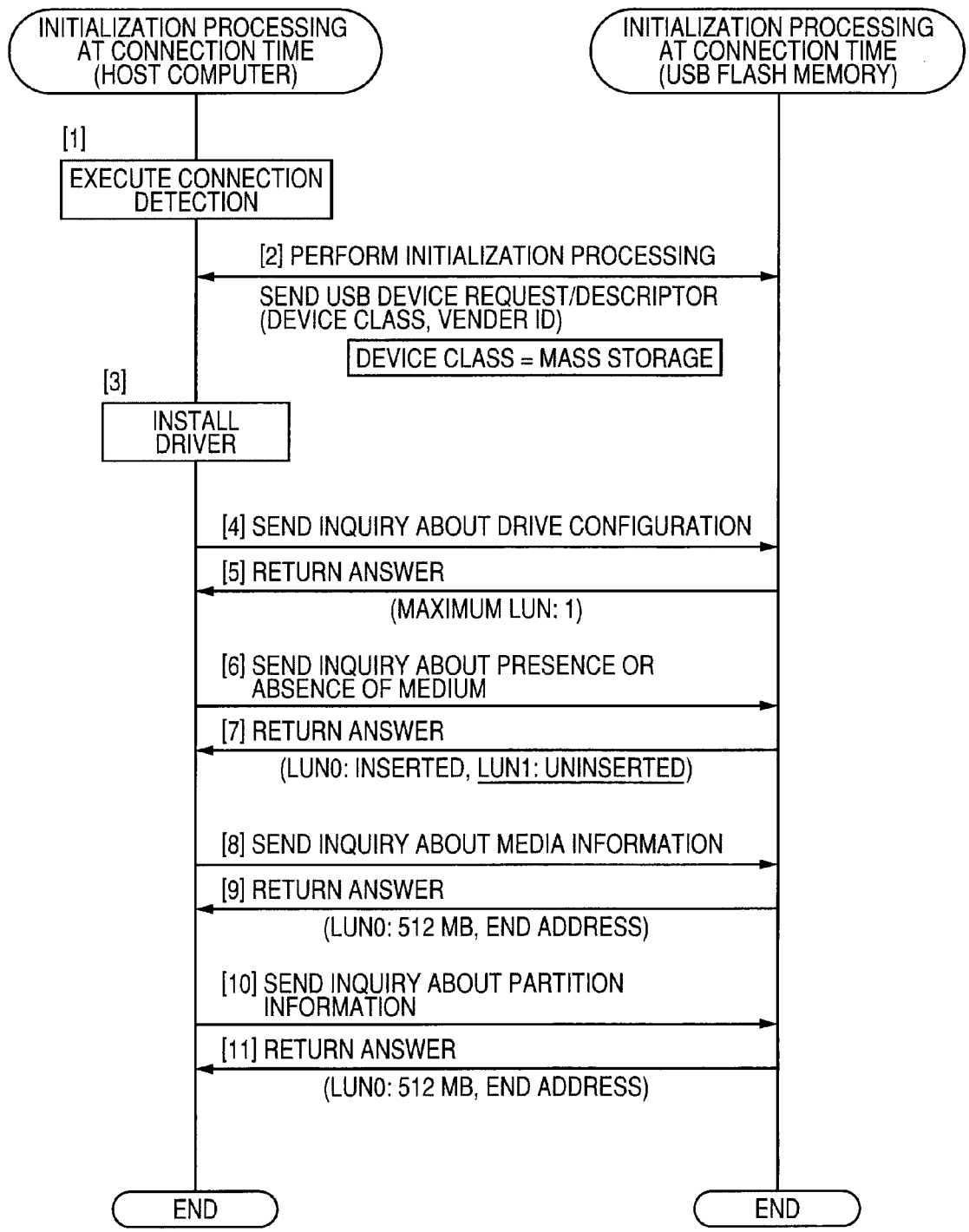
FIG. 7 is a flowchart to show a procedure of initialization processing at the connection time executed when the USB flash memory is connected to the host computer.

A2. Initialization Processing at Connection Time:

FIG. 7 is a flowchart to show a procedure of initialization processing at the connection time executed when the USB flash memory 100 is connected to the host computer 200. A procedure in the host computer 200 is shown on the left of FIG. 7 and a procedure in the USB flash memory 100 is shown on the right.

When the USB flash memory 100 is connected to the host computer 200, the USB bus interface 230 in the host computer 200 (FIG. 5) detects electrical connection of the device (step [1]). At step [2], initialization processing of USB is executed between the USB system software 232 and the USB basic processing section 112*a*. This initialization processing is defined in the standard specification of USB. Specifically, for example, a USB device request and a descriptor (device class, vender ID, product ID, etc.,) are transferred by control transfer on the message pipe 301. The USB system software 232 assigns an address to the detected device and sends the assigned address to the USB basic processing section 112*a*. For example, address "1" can be assigned to the USB flash memory 100.

Generally, "mass storage class" is used as the device class of USB flash memory. In the USB flash memory 100, the "mass storage class" is also set as the device class of the USB flash memory 100. Therefore, the host computer 200 recognizes that the USB flash memory is a device of mass storage class by seeing the descriptor from the USB flash memory 100.

At step [3], in the host computer 200, the OS 292 (FIG. 5) reads a device driver responsive to the device class of the USB flash memory 100 from the ROM 220 (FIG. 4) and installs the device driver. At this time, for example, a standard device driver for the mass storage class previously stored in the ROM 220 can also be installed. The procedure described so far is the so-called plug and play procedure of USB.

At step [4] (FIG. 7), in the host computer 200, the OS 292 (FIG. 5) sends an inquiry about the drive configuration to the USB flash memory 100 (address 1) through the USB mass storage class driver 234 and the stream pipe group 312. At step [5], the dedicated mass storage interface 112*b* returns an answer of maximum LUN (Logical Unit Number) as the drive configuration. The LUN is the number to identify each logical device that one device has, and the maximum LUN refers to the maximum value of the LUNs assigned to logical devices. As described above, the USB flash memory 100 operates as the logical multicard reader 500 having two slots. As shown in FIG. 6, 0 is assigned to the first slot SL2 as the LUN and 1 is assigned to the second slot SL2 as the LUN. Therefore, the dedicated mass storage interface 112*b* returns an answer of 1 as the maximum LUN.

At step [6] (FIG. 7), the OS 292 sends an inquiry about the presence or absence of a medium for each LUN to the USB flash memory 100. As described above, in the initial state, the configuration wherein the control card MCm is inserted into the first slot SL1 and a card is not inserted into the second slot SL2 is simulated. Then, at step [7], the dedicated mass storage interface 112*b* returns an answer indicating that a medium is inserted into the first slot SL1 (LUN0) and a medium is not inserted into the second slot SL2 (LUN1).

At step [8], the OS 292 sends an inquiry about media information of the capacity, the end address, etc., of the inserted medium (LUN0) to the USB flash memory 100. At step [9], the dedicated mass storage interface 112*b* returns an answer of the media information about the control card MCm inserted into the first slot SL1 based on the area specification table 138 stored in the EEPROM 130 (FIG. 2).

FIG. 8 is a schematic diagram to show an example of the descriptions of the area specification table 138. In the area specification table 138, user ID, physical area information, and logical area information are set for each registered user. 1 is set as the user ID of the user A, 2 is set as the user ID of the user B, and 3 is set as the user ID of the user C. The user ID 0 is set for the control card. The "physical area information" refers to the total capacity and the start and end addresses of the physical storage area allocated as the storage area for each user in the flash memory 150. The "logical area information" refers to the total capacity and the start and end addresses of logical area (partition) provided in each physical area. In the example in FIG. 8, the total capacity of the physical storage area and the total capacity of logical area match, but setting can also be made so that the total capacity of logical area becomes comparatively small. The entries for each user are set when the user is registered in the information processing system 1000. The entries for the control card having the user ID 0 are preset when the information processing system 1000 is initialized. The dedicated mass storage interface 112*b* returns an answer of the total capacity "512 MB," the end address "22222222," etc., as the media information about the control card MCm based on the area specification table 138.

At step [10], the OS 292 sends an inquiry about partition information of the inserted medium (LUN0) to the USB flash memory 100. At step [11], the dedicated mass storage interface 112*b* returns an answer of the partition information about the control card MCm inserted into the first slot SL1 (the total capacity "512 MB," the end address "22222222," etc.,) based on the area specification table 138 (FIG. 8). As a result of the initialization processing at the connection time described above, the simulated configuration wherein the multicard reader 500 is connected to the host computer 200, the control card MCm is inserted into the first slot SL1, and a card is not inserted into the second slot SL2 is seen from the OS 292. In other words, the OS 292 recognizes the USB flash memory 100 as the multicard reader 500 with the first slot SL1 having the control card MCm inserted thereinto and the second slot SL2 having no card inserted thereinto. After the initialization processing at the connection time, the host computer 200 and the USB flash memory 100 execute configuration update processing repeatedly.

Figure 9:
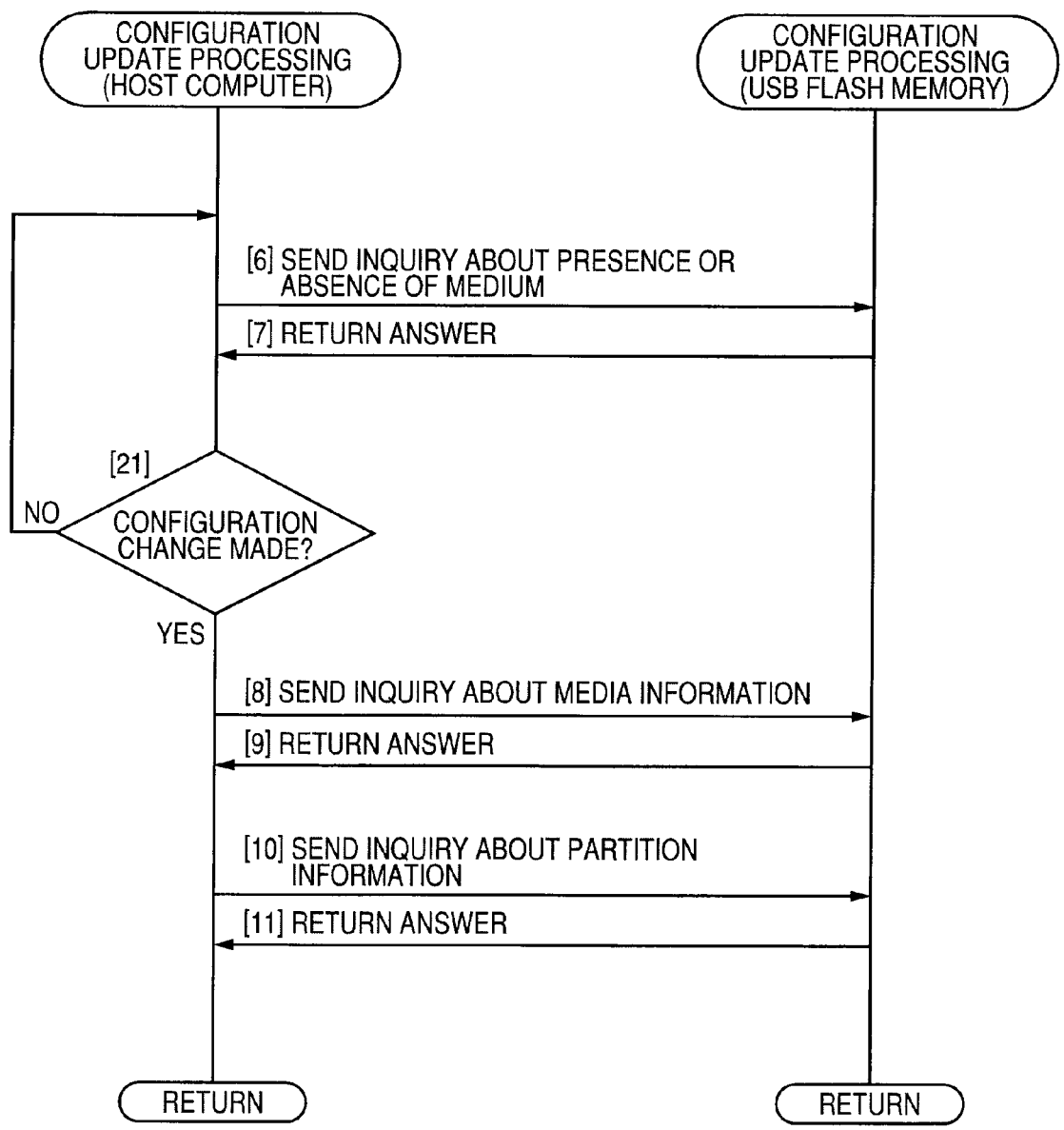
FIG. 9 is a flowchart to show a procedure of configuration update processing executed after the initialization processing at the connection time.

A3. Configuration Update Processing:

FIG. 9 is a flowchart to show a procedure of configuration update processing executed after the initialization processing at the connection time. Steps [6] and [7] are the same as the steps of the initialization processing at the connection time described above. That is, the host computer 200 sends an inquiry as to whether or not a medium is inserted into the logical device indicated by each LUN already grasped (first slot SL1, second slot SL2). The dedicated mass storage interface 112b returns an answer to the inquiry.

At step [21], the OS 292 determines whether or not configuration change has been made based on the answer from the dedicated mass storage interface 112b at step [7]. If no configuration change is made, namely, if the control card MCm remains inserted into the first slot SL1 and no card remains inserted into the second slot SL2, steps [6] and [7] are again executed. On the other hand, if the card of any user is inserted into the second slot SL2, the OS 292 determines that configuration change has been made. In this case, steps [8], [9], [10], and [11] are executed. The OS 292 can obtain the media information and the partition information about the newly inserted card. The process is returned to step [6] and the configuration update processing is executed repeatedly. Thus, in the host computer 200, update of the configuration of the USB flash memory 100 (logical multicard reader 500) is detected.

Figure 10:
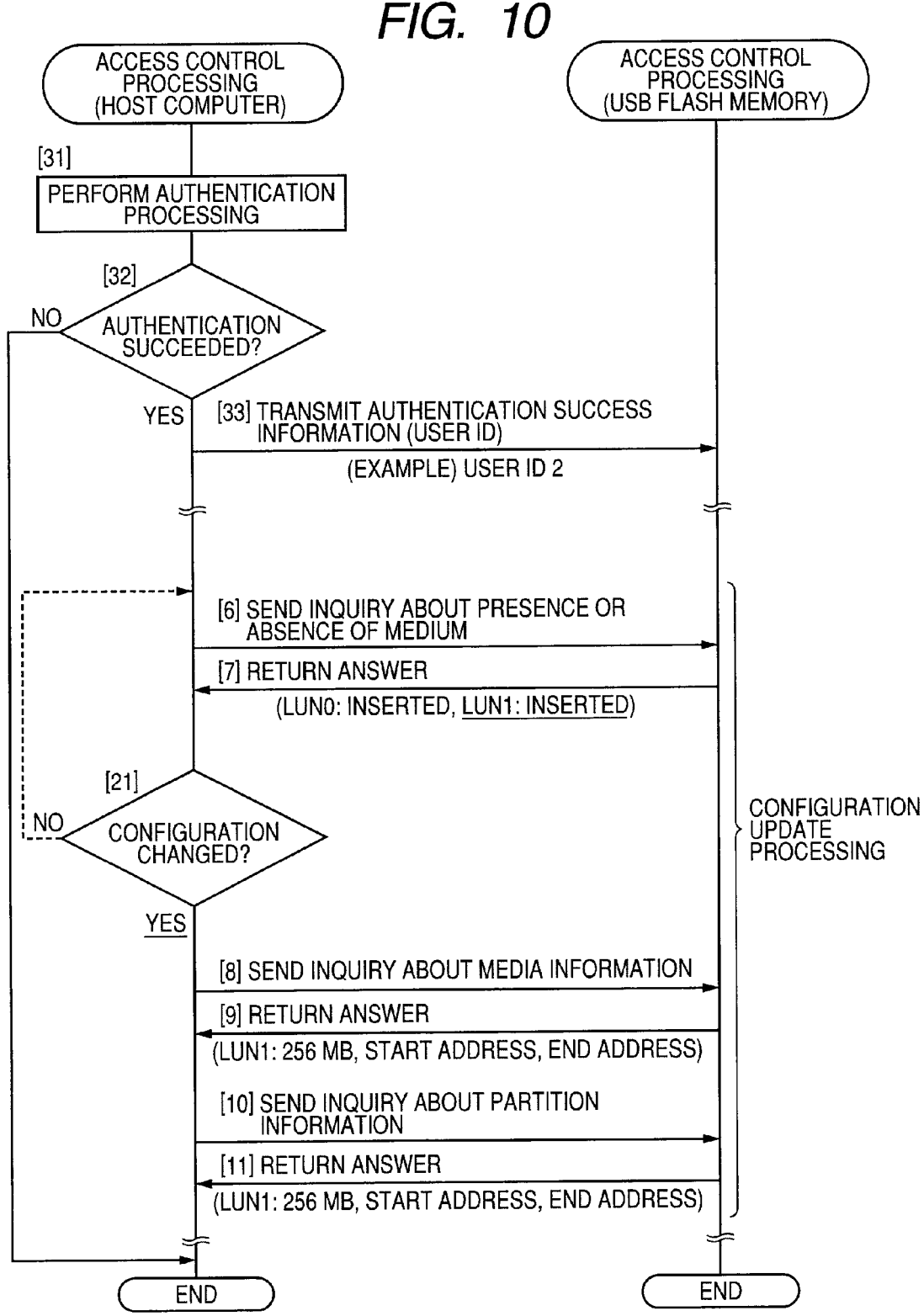
FIG. 10 is a flowchart to show a procedure of access control processing executed in the information processing system.

A4. Access Control Processing:

FIG. 10 is a flowchart to show a procedure of access control processing executed in the information processing system 1000. When any user accesses the control card MCm in the first slot SL1 in the host computer 200 and selects a start icon (not shown) of the authentication program 152a, the authentication program 152a starts and the user authentication section 212 (FIG. 4) displays a user authentication screen on the display section 270.

Figures 11, 12:
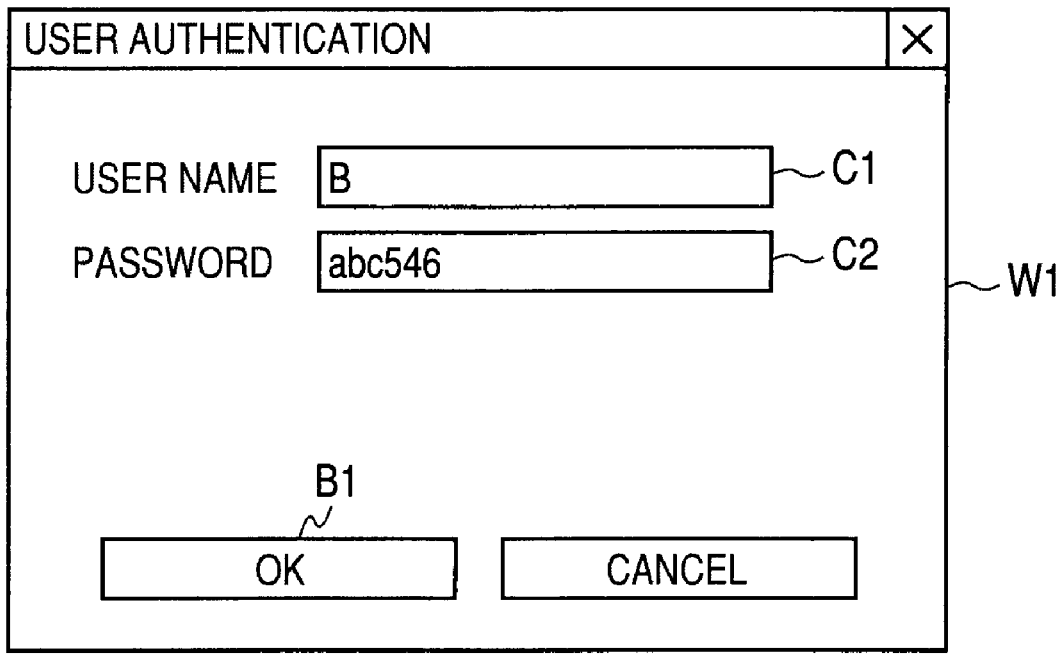
FIG. 11 is a schematic diagram to show a user authentication screen displayed on a display section.
FIG. 12 is a schematic diagram to show the contents of a user authentication table.

FIG. 11 is a schematic diagram to show the user authentication screen displayed on the display section 270. A user authentication screen W1 includes a user name input field C1, a password input field C2, and an OK button B1. When the user enters the user name and password in the user name input field C1 and the password input field C2 respectively and presses the OK button B1, access control processing is executed between the host computer 200 and the USB flash memory 100. In the example in FIG. 11, the user B enters the user name and the password in the user authentication screen W1.

When the access control processing (FIG. 10) is started, in the host computer 200 (FIG. 4), the user authentication section 212 (FIG. 4) references the user authentication table 152b in the control card area 152 and performs authentication processing (step [31]).

FIG. 12 is a schematic diagram to show the contents of the user authentication table 152b referenced at step [31]. In the user authentication table 152b, the user name, the password, and the user ID are set for each registered user. Therefore, at step [31], the user authentication section 212 compares the entered user name and password with the entries for each user and to perform authentication processing.

At step [32] (FIG. 10), the user authentication section 212 determines whether or not the authentication results in success. If the user authentication section 212 determines that the authentication results in success, it transmits the user ID of the authenticated user as information indicating that the authentication results in success to the USB flash memory 100 (step [33]). For example, if authentication of the user B results in success as described above, user ID 2 is transmitted to the USB flash memory 100 (see FIG. 12).

As described above, the configuration update processing is executed repeatedly between the host computer 200 and the USB flash memory 100 (see FIG. 9). If an inquiry about the presence or absence of a medium is received as one step of the configuration update processing (step [6]) after the user ID is received (step [33] in FIG. 10), the dedicated mass storage interface 112b then answers that a medium is also inserted into the second slot SL2 (LUN1) in addition to the first slot SL1 (step [7]).

Then, at step [21], the OS 292 determines that configuration change has been made, and thus sends an inquiry about media information (step [8]) and an inquiry about partition information (step [10]) for the newly inserted medium. In response to the inquiries, the dedicated mass storage interface 112b returns answers based on the area specification table 138 (FIG. 8) (steps [9] and [11]). For example, if the user ID 2 of the user B is received as described above, the dedicated mass storage interface 112b returns an answer of the total capacity "256 MB," the end address "44444444," etc., as the media information based on the entry of the user B in the area specification table 138 (the third stage from the top in FIG. 8). The dedicated mass storage interface 112b also returns an answer of the total capacity "256 MB," the end address "11111111," etc., as the partition information.

Therefore, the simulated configuration wherein the logical multicard reader 500 is connected to the host computer 200, the control card MCm is inserted into the first slot SL1, and the user B card MCb is inserted into the second slot SL2 is seen from OS 292. In other words, the OS 292 recognizes the USB flash memory 100 as the multicard reader 500 with the first slot SL1 having the control card MCm inserted thereinto and the second slot SL2 having the user card B inserted thereinto. Therefore, the user B can access the user B card MCb through the OS. In other words, the user B can access the user B area 156 in the USB flash memory 100 through the OS 292. From the OS 292, it is seen that the memory card of any other user (user A card MCa, user C card MCc) is not inserted into the logical multicard reader 500. Therefore, the OS 292 cannot access the memory card MCa or MCc. In other words, the user A area 154 and the user C area 158 cannot be accessed from the OS 292. Thus, the user B cannot access the storage area 154 allocated to the user A or the storage area 158 allocated to the user C, and access control is realized. The access control is realized not only when the user B uses the information processing system 1000, but also when the user A or C uses the information processing system 1000.

As described above, in the information processing system 1000, the USB flash memory 100 behaves as the logical multicard reader 500 and simulate a configuration that allows the logical memory card dedicated to each user to be inserted into the logical multicard reader 500. Therefore, each user can access his or her own memory card, namely, the storage area allocated to the user in the flash memory 150 and cannot access the memory card of any other user, namely, the storage area allocated to any other user. In the information processing system 1000, the memory card for another user is not seen from the OS 292. Therefore, a malicious user can be prevented from accessing the storage area for any other user through the OS 292.

B. Second Embodiment

Figure 13:
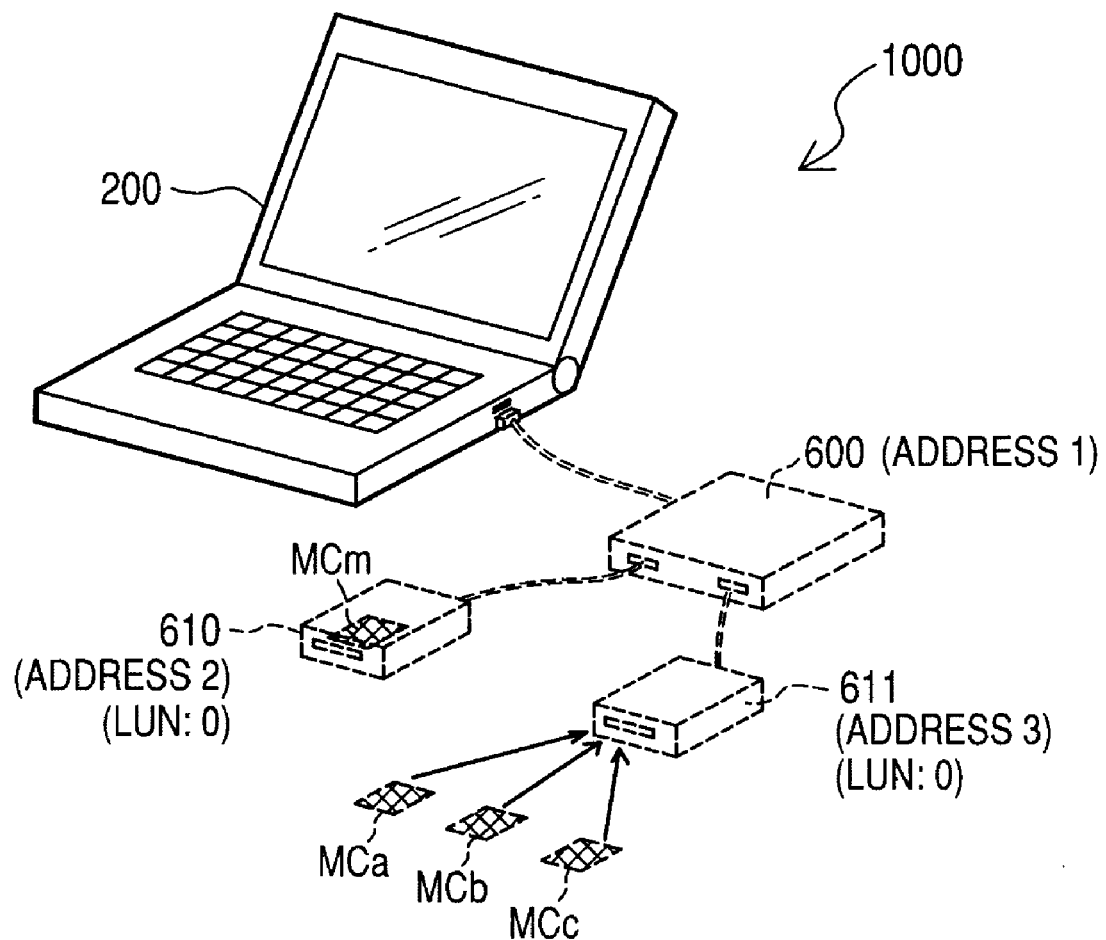
FIG. 13 is a schematic diagram to show the simulated device configuration for access control in an information processing system in a second embodiment of the invention.

FIG. 13 is a schematic diagram to show the simulated device configuration for access control in an information processing system in a second embodiment of the invention. The second embodiment of the invention differs from the first embodiment in that USB flash memory 100 simulatively behaves as a USB-HUB and a plurality of card readers connected to the USB-HUB. The actual device configuration is the same as that of the information processing system 1000 in FIG. 1.

Specifically, in the second embodiment, the USB flash memory 100 simulatively behaves as a logical USB-HUB 600 externally connected to a host computer 200 and two logical card readers 610 and 611 connected to ports of the logical USB-HUB 600. The two card readers 610 and 611 includes each a slot. A control card MCm is always inserted into the card reader 610. A user A card MCa, a user B card MCb, or a user C card MCc can be inserted into the card reader 611. In the initial state, none of the three user cards MCa, MCb, and MCc are inserted into the card reader 611 as in the first embodiment.

Figure 14:
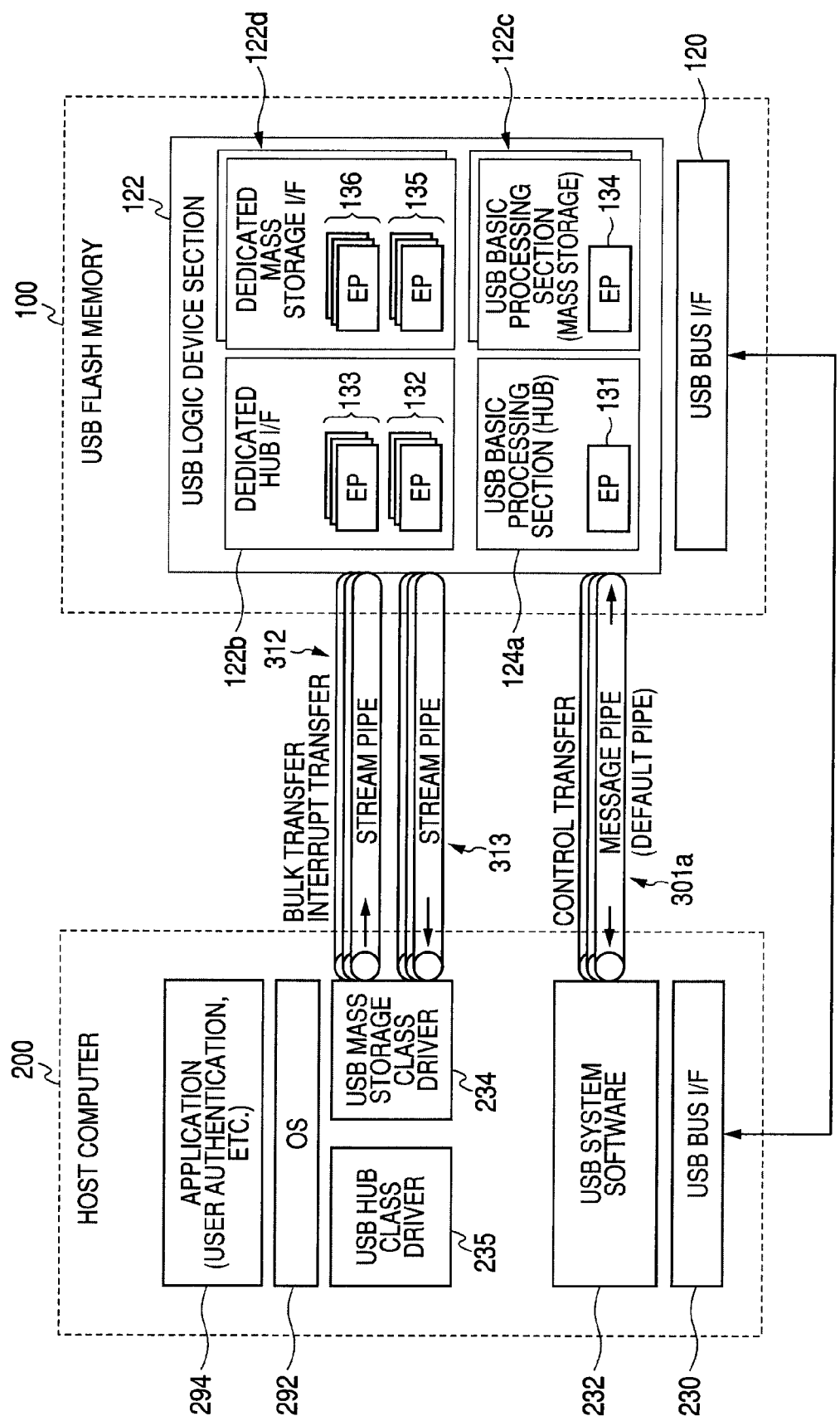
FIG. 14 is a schematic diagram to show the hierarchical structure of the functions concerning data transfer between a host computer and USB flash memory in the second embodiment of the invention.

FIG. 14 is a schematic diagram to show the hierarchical structure of the functions concerning data transfer between the host computer 200 and the USB flash memory 100 in the second embodiment of the invention. The hierarchical structure of the functions of the host computer 200 and the USB flash memory 100 differs from that in the first embodiment (FIG. 5) accompanying the difference in the simulated device configuration described above.

Specifically, in the host computer 200, in addition to a USB mass storage class driver 234, a USB hub class driver 235 is placed above USB system software 232. In the USB flash memory 100, a USB logic device section 122 is provided with a USB basic processing section 124a and a dedicated hub interface 122b corresponding to the USB-HUB 600 (FIG. 13). It is also provided with two USB basic processing sections 122c and two dedicated mass storage interfaces 122d corresponding to the two logical card readers 610 and 611. The USB basic processing section 124a includes an end point 131. The dedicated hub interface 122b includes an end point group 132 in an IN direction and an endpoint group 133 in an OUT direction. The two USB basic processing sections 122c include each an end point group 134. The two dedicated mass storage interfaces 122d include each an end point group 135 in the IN direction and an end point group 136 in the OUT direction.

Figure 15:
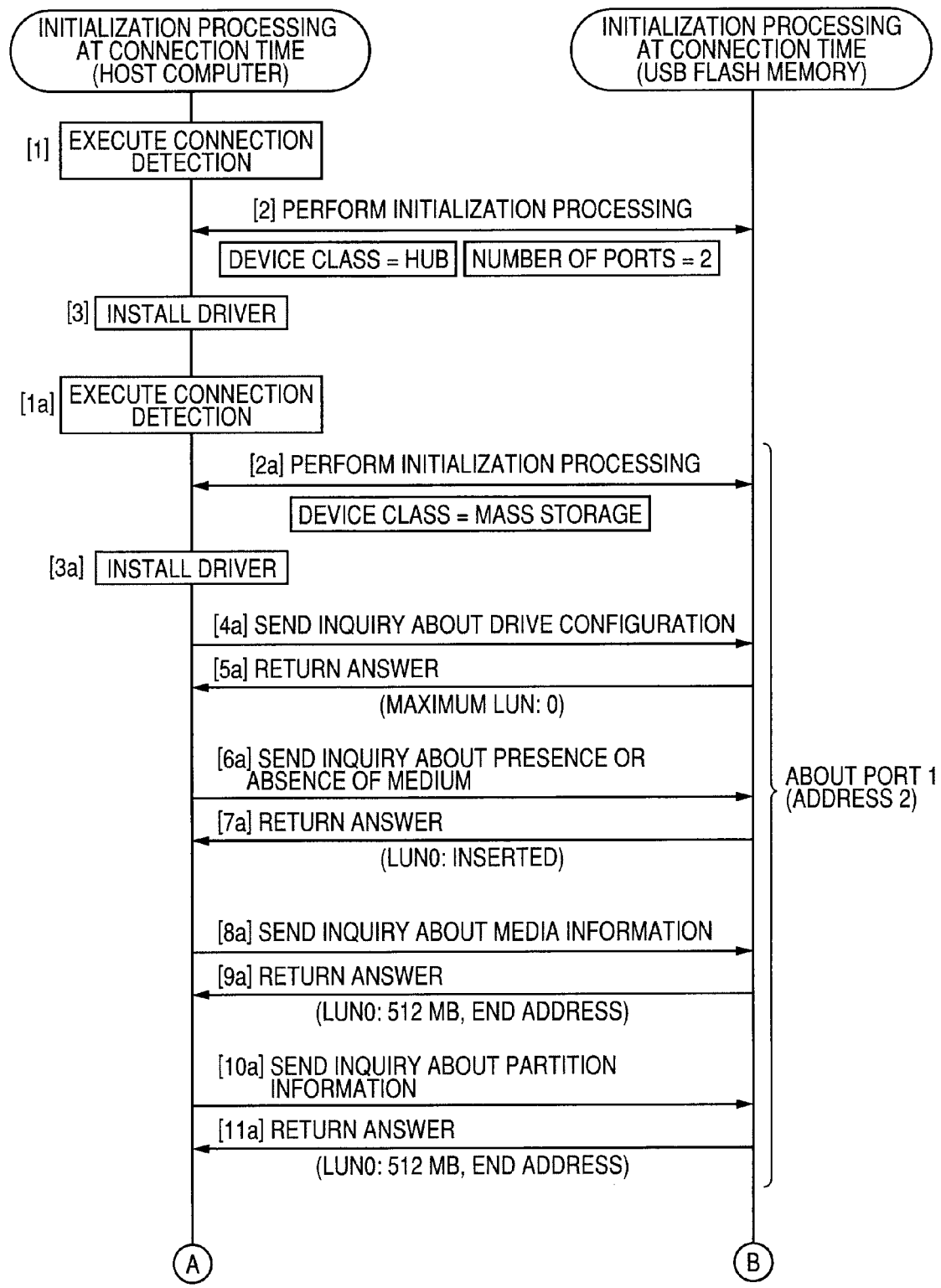
FIG. 15 is a flowchart to show a procedure of initialization processing at the connection time in the second embodiment of the invention.
Figure 16:
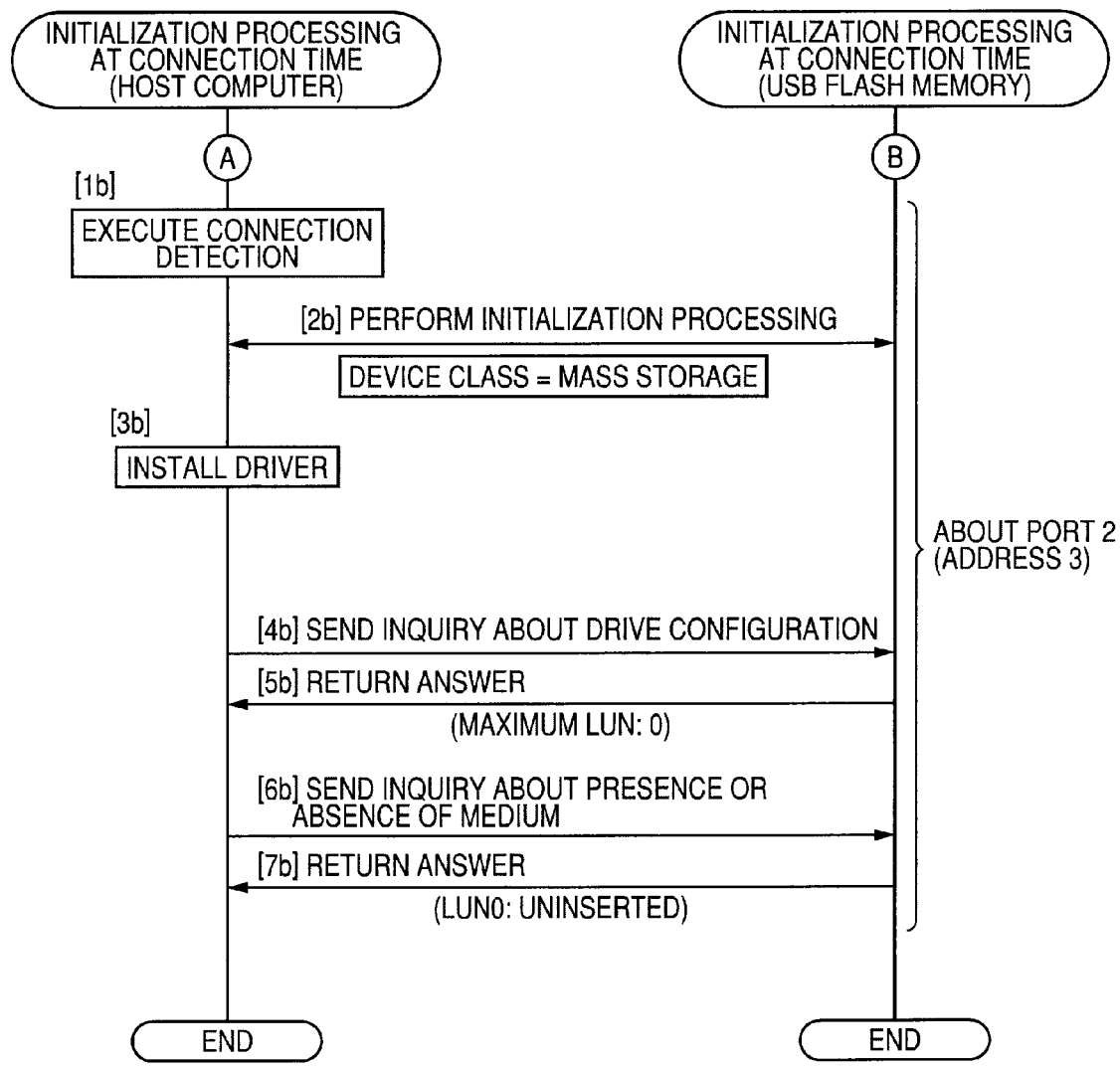
FIG. 16 is a flowchart to show the procedure of the initialization processing at the connection time in the second embodiment of the invention.

FIGS. 15 and 16 are flowcharts to show a procedure of initialization processing at the connection time in the second embodiment of the invention. Connection of the USB flash memory 100 is detected at step [1] (FIG. 15) as in the first embodiment. At step [2], unlike step [2] in the first embodiment, the USB basic processing section 124a (FIG. 14) corresponding to the USB-HUB 600 executes initialization processing. Therefore, as the device class, "hub class" is reported to the USB system software 232. The number of ports is defined as the description of the hub class and the number of ports "2" is reported to the USB system software 232 because the USB-HUB 600 has two ports in the example in FIG. 13. In the embodiment, the number of devices connected to the USB-HUB 600 is two (the card reader 611 for the simulated cards of the users and the card reader 610 for the control card MCm). Therefore, the number of the ports of the USB-HUB 600 is "two," but the description can also be set by assuming that the number of the ports is any of three or more. In the initialization processing, address 1 is assigned to the USB-HUB 600.

At step [3], OS 292 of the host computer 200 installs a device driver of the hub class. At this time, the host computer 200 can also install a standard device driver for the hub class previously stored in ROM 220. The procedure described so far is the initialization processing procedure with the USB-HUB 600 as a connection device and subsequently initialization processing is executed with the logical card readers 610 and 611 connected to the ports as connection devices.

At step [1a], the USB system software 232 detects that a device has been connected to the first port of the USB-HUB 600 as the USB basic processing section 124a reports connection of the device to the USB system software 232 by control transfer. At step [2a], initialization processing is executed between the USB system software 232 and the USB basic processing section 122c corresponding to the card reader 610. At this time, the USB basic processing section 122c reports "mass storage class" as the device class. Address 2 is assigned to the card reader 610. At step [3a], the OS 292 of the host computer 200 installs a device driver corresponding to the mass storage class.

Then, an inquiry about the drive configuration and an answer thereto (steps [4a] and [5a]) and an inquiry about the presence or absence of a medium and an answer thereto (steps [6a] and [7a]) are transferred between the USB system software 232 and the USB basic processing section 122c as in the first embodiment. Since the card reader 610 has only one slot and the control card MCm is inserted thereinto in the initial state as described above, an answer of insertion of a medium into the first slot (LUN0) with 0 as the maximum LUN is returned. In this case, for the inserted medium, an inquiry about media information and an answer thereto (steps [8a] and [9a]) and an inquiry about partition information and an answer thereto (steps [10a] and [11a]) are transferred as in the first embodiment.

Subsequently, at steps [1b] to [3b] (FIG. 16), similar processing to steps [1a] to [3a] (FIG. 15) described above is performed about the second port of the USB-HUB 600. Consequently, address 3 is assigned to the card reader 611 and in the host computer 200, the device driver corresponding to the mass storage class is installed. Subsequently, at steps [4b] to [7b], similar processing to steps [4a] to [7a] (FIG. 15) described above is performed about the second port of the USB-HUB 600. In the initial state, no card is inserted into the card reader 611. Therefore, at the termination of step [7b], the initialization processing about the second port terminates and the initialization processing at the connection time is complete.

As a result of the processing described above, from the OS 292, the simulated device configuration shown in FIG. 13 is seen. After the initialization processing at the connection time, configuration update processing (FIG. 9) is executed repeatedly between the host computer 200 and the USB flash memory 100 as in the first embodiment. The configuration update processing is executed for each of the three logical devices (USB-HUB 600 and two card readers 610 and 611). If any user attempts to undergo authentication from a user authentication screen (FIG. 11), access control processing (FIG. 10) is started as in the first embodiment. If the user authentication results in success, the OS 292 can be caused to recognize that the memory card corresponding to the authenticated user has been inserted into the card reader 611. Therefore, access control similar to that of the first embodiment can be realized.

C. MODIFIED EXAMPLES

It is to be understood that the invention is not limited to the specific embodiments described above and can be embodied in various forms without departing from the spirit and scope of the invention. For example, the following modifications are also possible.

C1. Modified Example 1

In the embodiments described above, there is provided a the simulated configuration in which the storage area allocated to each user is a logical memory card and the logical memory card is inserted into the logical multicard reader 500 or the logical (single-) card reader 611, but the invention is not limited to it. For example, a configuration in which the storage area allocated to each user is a logical CD-ROM and this logical CD-ROM is inserted into a logical CD-ROM drive can also be simulated. Alternately, a configuration in which logical MO is inserted into a logical MO drive can also be simulated. A configuration in which the storage area allocated to each user is a logical external hard disk drive and if user authentication results in success, the logical external hard disk drive corresponding to the user is connected to the USB hub (is mounted on the host computer) can also be simulated. That is, generally a configuration in which the storage area allocated to each user is a logical storage medium and if user authentication results in success, the logical storage medium corresponding to the user is mounted on the host computer can be simulated.

C2: Modified Example 2

In the embodiments described above, the logical memory card inserted into the logical multicard reader 500 or the logical card reader 611 is dedicated to each user, but the invention is not limited to it; the logical memory card may be dedicated to a group made up of two or more users. Specifically, storage areas are allocated in group units in the flash memory 150. If the user logs in to the system, a configuration wherein the logical memory card corresponding to the storage area allocated to the group to which the user belongs is inserted into the multicard reader 500 or the card reader 611 is simulated. Accordingly, the storage area (file and directory) in the flash memory 150 can be shared by the users in the group and access to the storage area from a member in a different group can be limited.

C3: Modified Example 3

In the embodiments described above, the storage location of the authentication program is on the flash memory 150, but the invention is not limited to it; the authentication program may be stored on the hard disk drive 260 (FIG. 4) or the ROM 220 provided in the host computer 200. In this case, in the first embodiment, the control card MCm becomes unnecessary and therefore a configuration in which a logical card reader including only one slot in place of the logical multicard reader 500 can also be simulated. In the second embodiment, the control card MCm and the card reader 610 for the control card MCm can also be omitted.

C4: Modified Example 4

Figure 17A:
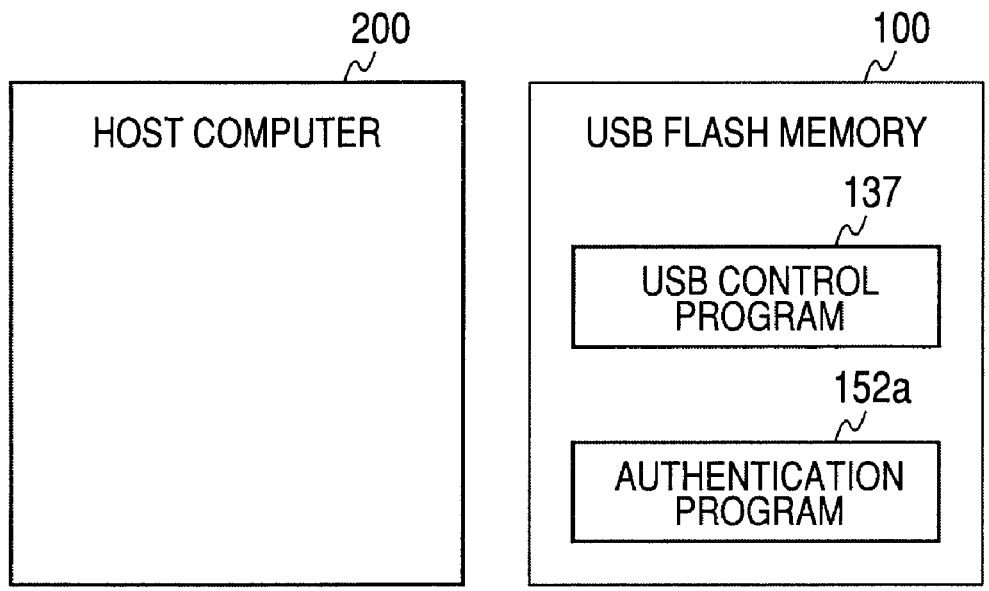
FIGS. 17A and 17B are schematic diagrams to show the USB flash memory having programs previously stored thereon according to the first and second embodiments of the invention.
Figure 17B:
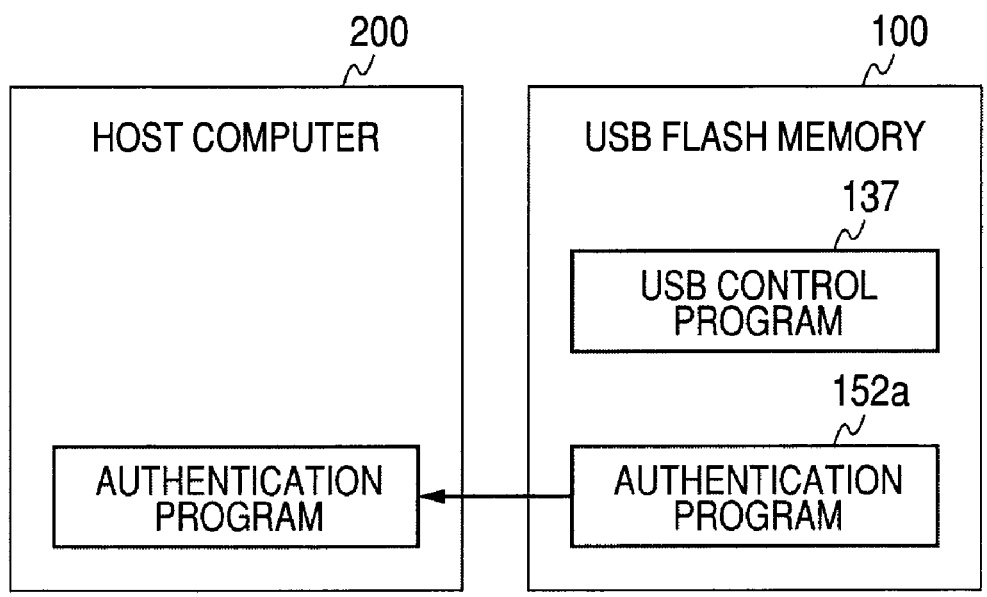
Figure 18A:
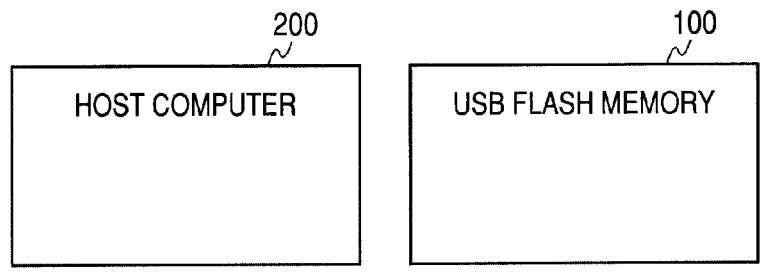
FIGS. 18A to 18C are schematic diagrams to show an example for implementing the access control function in a regular USB flash memory.
Figure 18B:
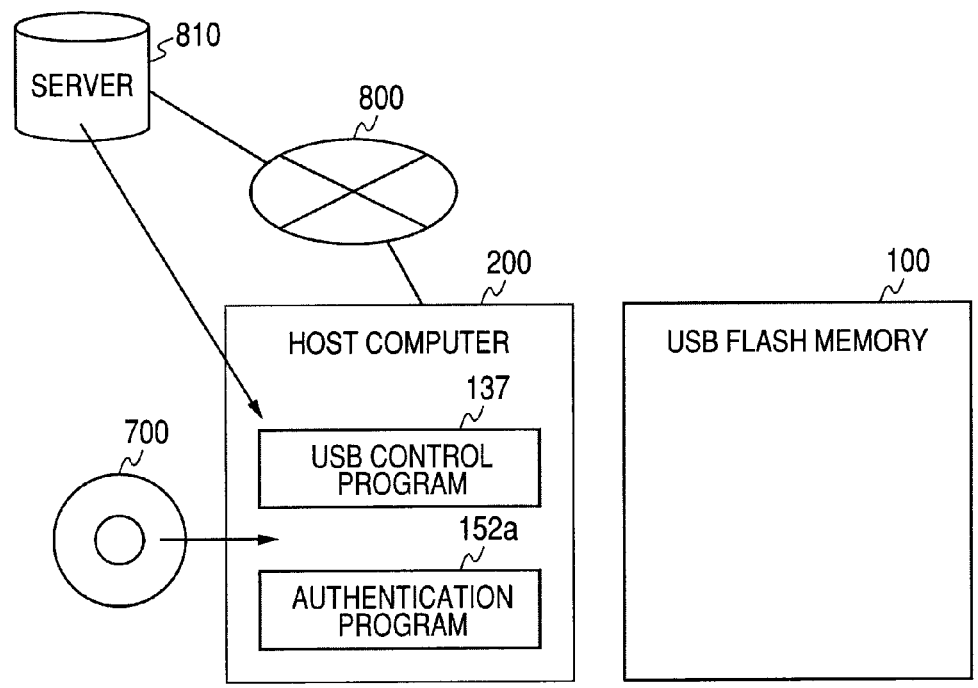
Figure 18C:
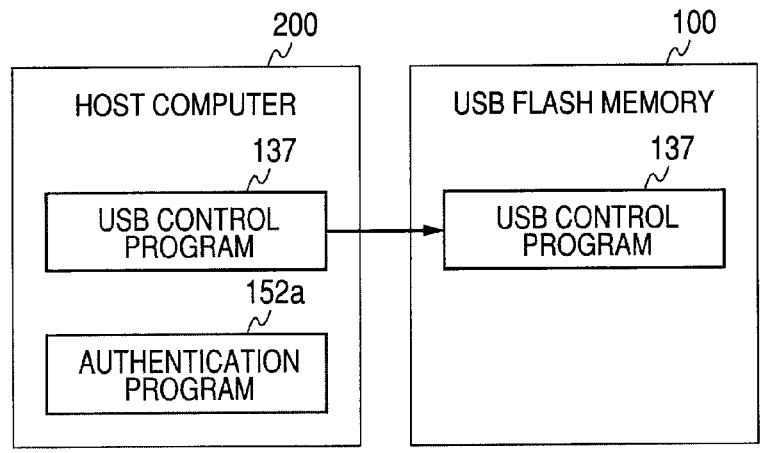

In the embodiments described above, the USB control program 137 and the authentication program 152*a* is previously stored on the USB flash memory 100 as shown in FIGS. 17A and 17B. In the example (above embodiments) of FIG. 17A, the USB control program 137 is previously stored on the USB flash memory 100 (specifically, EEPROM 130), and the authentication program 152*a* is also previously stored on the USB flash memory 100 (specifically, flash memory 150). Therefore, there can be provided the USB flash memory 100 previously dedicated for the access control of the embodiments. When the host computer 200 access the storage area, the host computer 200 reads and executes the authentication program 152*a* stored on the flash memory 150 to authenticate the user as shown in FIG. 17B, and when the authentication is succeeded, the access to the storage area allocated to the authenticated user is allowed. However, the USB control program 137 and/or authentication program 152*a* may not be previously stored on USB flash memory 100. As show in FIG. 18A, the USB control program 137 and the authentication program 152*a* are not stored on both the USB flash memory 100 and the host computer 200. Then, as shown in FIG. 18B, the USB control program 137 and the authentication program 152*a* may be stored on the host computer 200 by downloading the program from the server 810 via the network 800 such as internet or by installing the program from the external storage media 700 such as CD-ROM. Thereafter, as shown in FIG. 18C, the USB control program 137 is transferred to the USB flash memory 100 thereby the USB control program 137 is stored on the USB flash memory 100. At this time, the authentication program 152*a* may also be transferred to the USB flash memory 100 to provide the USB flash memory 100 having the both the program 137 and 152*a* stored thereon. However, the authentication program 152*a* may not be transferred to the USB flash memory 100 to embody the modified example 3 as shown in FIG. 18C. Accordingly, the access control function of the embodiments can be implemented in a regular USB flash memory that does not previously support the access control.

C5: Modified Example 5

In the embodiments described above, user authentication is conducted in the host computer 200, but may be executed in the flash memory 150. Specifically, for example, an authentication device (for example, an authentication device using a password, an authentication device based on biometrics of fingerprint, iris, etc.,) is connected to the general-purpose input/output port 180 of the flash memory 150 (FIG. 2) and can also be used to conduct user authentication. In this case, if user authentication results in success, the user ID as information indicating that user authentication results in success can also be transmitted from the authentication device to the USB logic device section 112 (dedicated mass storage interface 112*b*). That is, any device provided the information processing system 1000 may conduct user authentication and if user authentication results in success, the user ID is transmitted to the USB logic device section 112. If the number of the registered users is one, a message indicating that authentication results in success can also be sent to the USB logic device section 112 in place of the user ID. Also in this configuration, if the user logs in to the system, a configuration in which the logical memory card corresponding to the storage area allocated to the user is inserted into the logical card reader can be simulated.

C6: Modified Example 6

In the embodiments described above, the connection interface the host computer 200 and the USB flash memory 100 is USB. However, not only the USB, but also any desired interface capable of detecting connection of an external device can be adopted. Specifically, eSATA (external Serial ATA), IEEE1394, etc., can also be adopted.

C7: Modified Example 7

In the embodiments described above, the multicard reader 500 of two slots and the two single-card readers 610 and 611 are exemplified as a simulated devices (FIGS. 5 and 13); instead, a multicard reader/writer of three or more slots and three or more single-card readers can also be adopted. According to the modified example 7, more complicated user management can be accomplished.

C8: Modified Example 8

In the embodiments described above, a part of the configuration implemented as the hardware may be replaced with software; whereas, a part of the configuration implemented as the software may be replaced with hardware.

According to the above embodiments and modified examples of the invention, when the storage device such as the USB flash memory 100 receives the authentication success information, the storage device (e.g., the control unit such as CPU 110 executing the USB control program 137) simulatively forms a state in which the storage area allocated to the authenticated user is mounted and the storage area allocated to another user is unmounted. In other words, the storage device logically mounts the storage area allocated to the authenticated user and logically unmounts the storage area allocated to user(s) other than the authenticated user. Accordingly, access from the host computer is restricted such that the another user can be prevented from accessing the storage area allocated to each user from the host computer.

Specifically, the host computer can simulatively see (recognize) the storage area to the user as a removable storage medium after user authentication results in success and can also be simulatively see (recognize) a state in which the removable storage medium is inserted into the storage medium processing device and is mounted. Therefore, access control can be realized so that the mounted removable storage medium, namely, only the storage area to the authenticated user can be accessed from the host computer and the storage area allocated to any other user cannot be accessed.

What is claimed is:

1. A removable storage device configured to be connected to a host computer, said removable storage device comprising:
   a storage unit on which one or more storage areas are allocated to a plurality of users, the storage unit connectable to the host computer via a direct local connection;
   a control unit configured to, when the storage device receives authentication success information indicating that authentication for one of the users is succeeded from the host computer or other external device, simulatively mount the storage area allocated to the authenticated user so that the storage area is visible to the user and unmount the storage area allocated to another user; and
   a configuration information storage section configured to store, for each user, user identification information and storage area configuration information concerning a configuration of the storage area allocated to the user in association with each other,
   wherein the control unit comprises a logic device section, wherein the authentication success information contains the user identification information of the authenticated user, and
   wherein the logic device section is configured to:
   (i) when said storage device is connected to the host computer via the direct local connection, transmit device configuration information to the host computer, the device configuration information indicating that said storage device is a storage medium processing device to which a removable storage medium is mountable;
   (ii) upon reception of the authentication success information, notify the host computer that the removable storage medium is mounted to the storage medium processing device; and
   (iii) upon reception of a request for sending the device configuration information of the removable storage medium from the host computer, transmit the device configuration information concerning the allocated storage area to the user indicated in the user identification information contained in the received authentication success information to the host computer as the device configuration information of the removable storage medium.

2. The removable storage device according to claim 1, wherein the control unit is configured to send the device configuration information indicating that the storage medium processing device is a memory card reader or a memory card reader/writer, and the removable storage medium is a memory card.

3. The removable storage device according to claim 1, wherein said storage device comprises a USB interface or an eSATA interface connectable to the host computer via the direct local connection.

4. The removable storage device according to claim 1, wherein the removable storage device is configured to simulatively behave as a logical USB-HUB externally connected to the host computer.

5. The removable storage device according to claim 1, wherein the removable storage device is configured to simulatively behave as a USB-HUB externally connected to the host computer and two logical card readers connected to first and second ports, respectively, of the logical USB-HUB.

6. The removable storage device according to claim 5, wherein a control card is simulatively inserted into the first logical reader connected to the first port of the logical USB-HUB.

7. The removable storage device according to claim 5, wherein a plurality of logical cards, each corresponding to a removable storage medium, are simulatively inserted into the second logical reader connected to the second port of the logical USB-HUB.

8. The removable storage device according to claim 5, wherein the device configuration transmitted from the logic section to the host computer includes information indicating that the storage device is a hub class device.

9. The removable storage device according to claim 5, wherein the device configuration transmitted from the logic section to the host computer includes information indicating a number of ports of the logical USB-HUB.

10. The removable storage device according to claim 7, wherein upon reception of the request for sending the device configuration information of the removable storage medium from the host computer, the logic section transmits device configuration information concerning a logical card allocated to the user indicated in the user identification information contained in the received authentication success information to the host computer as the device configuration information of the removable storage medium.

11. A storage device access control method for controlling access to a removable storage device connectable to a host computer, said storage device access control method comprising:
- allocating storage areas to a plurality of users in the storage device connectable to the host computer via a direct local connection;
- when the storage device receives authentication success information indicating that authentication for one of the users is succeeded from the host computer or other external device in the storage device, simulatively mount the storage area allocated to the authenticated user so that the storage area is visible to the user and unmount the storage area allocated to another user; and
- storing, for each user, user identification information and storage area configuration information concerning a configuration of the storage area allocated to the user in association with each other, wherein
- the authentication success information contains the user identification information of the authenticated user, and
- (i) when said storage device is connected to the host computer via the direct local connection, transmitting device configuration information from the storage device to the host computer, the device configuration information indicating that said storage device is a storage medium processing device to which a removable storage medium is mountable;
- (ii) upon reception of the authentication success information at the storage device, notifying the host computer that the removable storage medium is mounted to the storage medium processing device; and
- (iii) upon reception of a request for sending the device configuration information of the removable storage medium from the host computer, transmitting the device configuration information concerning the allocated storage area to the user indicated in the user identification information contained in the received authentication success information from the storage device to the host computer as the device configuration information of the removable storage medium.

12. A non-transitory computer-readable medium having a computer program stored thereon and readable by a computer, said computer program, when executed by the computer, causes the computer to perform operations for a removable storage device connectable to a host computer which comprises a storage unit on which one or more storage areas allocated to a plurality of users, said operations comprising:
- when the storage device, which is connectable to the host computer via a direct local connection, receives authentication success information indicating that authentication for one of the users is succeeded from the host computer or other external device in the storage device, simulatively mount the storage area allocated to the authenticated user so that the storage area is visible to the user and unmount the storage area allocated to another user; and
- storing, for each user, user identification information and storage area configuration information concerning a configuration of the storage area allocated to the user in association with each other, wherein
- the authentication success information contains the user identification information of the authenticated user, and
- (i) when said storage device is connected to the host computer via the direct local connection, transmitting device configuration information from the storage device to the host computer, the device configuration information indicating that said storage device is a storage medium processing device to which a removable storage medium is mountable;
- (ii) upon reception of the authentication success information at the storage device, notifying the host computer that the removable storage medium is mounted to the storage medium processing device; and
- (iii) upon reception of a request for sending the device configuration information of the removable storage medium from the host computer, transmitting the device configuration information concerning the allocated storage area to the user indicated in the user identification information contained in the received authentication success information from the storage device to the host computer as the device configuration information of the removable storage medium.

\* \* \* \* \*